United States Patent [19]

Oshita et al.

[11] Patent Number: 5,019,981
[45] Date of Patent: May 28, 1991

[54] DEVICE AND METHOD FOR DECREASING POWER CONSUMPTION OF A STEERING ANGLE DETECTING SYSTEM FOR VEHICLE

[75] Inventors: Saiichiro Oshita; Toyohiko Mouri; Tsutomu Takahashi, all of Tokyo, Japan

[73] Assignee: Fuji Jukogyo Kabushiki Kaisha, Tokyo, Japan

[21] Appl. No.: 487,300

[22] Filed: Mar. 2, 1990

[30] Foreign Application Priority Data

Mar. 9, 1989 [JP] Japan .................................. 1-57100
Oct. 4, 1989 [JP] Japan .................................. 1-259443

[51] Int. Cl.⁵ .......................................... B62D 5/06
[52] U.S. Cl. .......................................... 364/424.05
[58] Field of Search ............. 364/187, 424.05, 431.11, 364/431.12; 180/204, 280, 141

[56] References Cited

U.S. PATENT DOCUMENTS 4,793,431 12/1988 Eto et al. ........................ 364/424.05
4,793,536 12/1988 Eto et al. ........................ 364/424.05
4,803,629 2/1989 Moto et al. ...................... 364/424.05
4,942,532 7/1990 Mori ............................. 364/424.05

Primary Examiner—Salvatore Cangialosi
Attorney, Agent, or Firm—Beveridge, DeGrandi & Weilacher

[57] ABSTRACT

There are disclosed a device and method for saving power supply of a steering sensor for a vehicle having a conventional circuit for detecting a steering angle and a supplementary circuit for detecting an amount of steering angle change when an ignition switch is turned off. The conventional circuit comprises a rotary encoder for generating two signals of sine waveform-like having a phase discrepancy of 90 degrees responsive to a rotation of a steering shaft, and a microcomputer for calculating an absolute angle from the sine waveform-like signals. The supplementary circuit comprises a waveform shaping circuit for converting the sine signals into two rectangular wave pulse signals. While the switch is turned on, the circuit continues to detect the absolute angle based on the sine waves. When the switch is turned off, the supplementary circuit counts and hold the change amount of the angle as the pulse signals while the circuit maintains the storage of the last absolute angle. The microcomputer reads numbers of the pulse signals to set the initial absolute angle and to start operation for detecting the absolute angle.

2 Claims, 4 Drawing Sheets

DEVICE AND METHOD FOR DECREASING POWER CONSUMPTION OF A STEERING ANGLE DETECTING SYSTEM FOR VEHICLE

BACKGROUND OF THE INVENTION

The present invention relates to a device and a method of decreasing electric power consumption in a steering angle detecting system for a vehicle, and more particularly, relates to the system with an analog-type steering sensor which detects a steering angle and direction of the vehicle by an output voltage having a sine wave form.

Generally, the vehicle performing various controls such as anti-lock control responsive to a steering angle of a steering wheel requires a steering sensor for detecting rotational angle and direction of a steering shaft. The steering sensor is attached to a steering system 1 comprising a steering gear box 2 which is connected to knuckle arms 3 at both ends thereof through tie-rod ends 4, respectively, and a steering column 5, as shown in FIG. 1A. The column 5 is a hollow circular cylinder through which a steering shaft 50 is inserted, as shown in FIG. 1B. The steering shaft 50 is connected to the box 2 at one end thereof through a universal joint 6. The other end of the column 5 is connected to a steering wheel 7 through a column cover 8. The cover 8 is fixed to the vehicle body by a bracket 9 and fastening bolts (not shown).

The shaft 50 has a large diameter portion 51 connected with the wheel 7, a small diameter portion 52 connected with the joint 6, a middle diameter portion 53 located between both portions 51 and 52 for connecting them to each other. The steering sensor 10 comprises photo-interrupters 11 and 12 respectively located in positions 90 degrees apart from each other, a photo-interrupter 13 for detecting a neutral position of the steering wheel 7, and a steering disc 55 fixed on an outer surface of the middle diameter portion 53 of the shaft 50, as shown in FIG. 1B,. The photo-interrupters 11 to 13 include photo emitters 11a to 13a such as light emitting diodes, and photo receptors 11b to 13b each paired with the emitters 11a to 13a, respectively. The disc 55 is located between the emitters 11a to 13a and receptors 11b to 13b, and has a plurality of slits 56 formed radially and opposed to the emitters 11a and 12a and the receptors 11b and 12b at even radius intervals, so that each of the receptors 11b and 12b generates the sine wave voltage at one pitch of the slit. The disc 55 also has a neutral slit 57 opposed to the emitter 13a and receptor 13b for indicating the neutral position of the shaft 50. Accordingly, the disc 55 is a so-called encoded disc.

The aforementioned prior art uses an optical type rotary encoder having the encoded disc, the emitter and the receptor as the steering sensor. Another example of the prior art may use a magnetic type rotary encoder as the steering sensor 10. The magnetic type encoder has a steering disc or drum mounted on the steering shaft 50 on which N poles and S poles alternate at even intervals. The magnetic encoder has magnetic reluctance elements or Hall effect elements, which generate a voltage of sine waveform-like dependent on the rotation of the disc or drum. An example of the prior art is disclosed in Japanese Utility Model Laid-open No. 62-51214 (1987).

There are various problems when the aforementioned rotary encoder such as the optical type or the magnetic type is applied to the steering sensor for the vehicle.

First, as the above rotary encoder basically detects an amount of a relative rotational angle change of the steering shaft, it is necessary for detecting an absolute steering angle to set a zero angle as the neutral position and to calculate and store a change amount from the neutral position by a microcomputer. Accordingly, a neutral position mark is formed on the rotational disc 55 or the rotational drum, so that the neutral position is set.

However, as the steering shaft generally enables to rotate two to four rotations between full rightward and leftward steering operations, the neutral position mark is detected at least three times at a zero degree point (neutral point), and two points when the steering shaft is turned 360 degrees from the zero degree point in the right and left directions. Accordingly, though the sensor may continue to detect the absolute angle as described above while the power is in "ON" state once the stored absolute angle is lost by shutting the power of the microcomputer, it is impossible to detect the absolute angle thereafter. Even if the power is supplied to the microcomputer again after once shutting, the zero degree neutral point needs to be reset from three detection points of the neutral position mark by complicated operation.

Accordingly, the power continues supply to at least a memory storing the absolute angle even if the ignition switch is turned off at parking, so that the absolute angle is kept stored and the change of the steering angle at parking may be detected.

A second problem relates to the high resolution at a steering angle detection.

For example, in the optical type rotary encoder, the receptor 11b of the photo-interrupter receives one time of the change of the light and shade and converts it into output voltage having the sine wave form while the rotary disc rotates by one pitch of the slits. In the magnetic rotary encoder, the magnetic sensor detects one time of the change of the magnetic force and converts it into the output voltage of the sine wave form while the rotary drum rotates by one pitch of the N and S poles.

Then, the rotary disc or drum rotates by one pitch and generates an output signal of one wave form. The output signal is changed into pulse forms which are counted by the microcomputer to obtain the change amount of the steering angle by the usual detection method for the steering angle. Accordingly, the resolution of the steering angle detection is determined by the number of slits in the rotary disc or the number of magnetic poles of the rotary drum in the method.

However, the rotary disc or drum may not be made larger due to space restrictions, so that it is impossible to increase the slits or magnetic poles. Accordingly, it is impossible to make a resolution higher enough.

In order to solve the problem, there has been developed a steering angle detection method using an optical or magnetic rotary encoder for generating two analog signals which vary like sine wave with a phase discrepancy of 90 degrees to each other as the vibration of the steering angle. A microcomputer calculates a steering angle on the basis of two digital signals converted from the analog signals by an analog/digital converter. By the method, it is possible to make the resolution higher in spite of the number of slits or magnetic poles because of one-to-one correspondence between the analog signals and the steering angle.

However, as a plurality of cycles of the sine wave are output in a rotation range of the steering shaft, the above method has the problem that the absolute angle is not able to be detected if the reference position is not reset once the power source is shut off in the same manner as the pulse count type.

As described above, the method for directly calculating the steering angle from two sine wave signals by analog/digital converter, is effective as the steering angle detection method for the vehicle because of the increased resolution. However, the method makes the power consumption of the steering angle detection system large in comparison with the pulse count method, so that it is difficult to compensate for extended operation by a backup of the battery at the parking.

SUMMARY OF THE INVENTION

A primary object of the present invention is to provide a device and method capable of greatly decreasing the power consumption by using a supplementary circuit counting steering angle change at parking when an ignition switch is turned off even if a sensor generates a sine wave-like signal.

Another object is to provide a steering angle sensor capable of improving a detectional accuracy of a steering angle by the supplementary circuit which is backed up by the power supply from a battery when an ignition switch is turned off.

In order to achieve the above objects, a device for decreasing the power consumption in a steering angle detection system according to the present invention having a steering sensor for generating two signals of sine wave-like with a phase discrepancy of a predetermined degree responsive to a rotation of a steering shaft, and a steering angle calculating circuit responsive to the signals from the steering sensor for calculating an absolute steering angle and for storing the absolute steering angle in a memory while an ignition switch is turned on, the calculating circuit receiving no power supply except the memory when the ignition switch is turned off, comprises a shaping circuit for shaping the two signals of sine wave-like into two signals of rectangular pulse-like; a counter for counting a number of rectangular pulses output from the shaping circuit in order to detect an amount of the steering angle change when the ignition switch is turned off; and the above calculating circuit for reading the number of pulses from the counter to correct the absolute steering angle stored in the memory when switch is turned on again.

Furthermore, a method for reducing the power consumption in a steering angle detection system having a steering sensor for two sine wave-like signals with a phase discrepancy of a predetermined degree responsive to a rotation of a steering shaft, and a steering angle calculating circuit responsive to the signals from the steering sensor for calculating an absolute steering angle in a memory while an ignition switch is turned on, the calculating circuit receiving no power supply except for the memory when the ignition switch is turned off, comprises the step of shaping the two signals of sine wave-like into signals of rectangular pulse-like in a shaping circuit; the steps of counting a number of the rectangular pulses output from the shaping circuit by a counter in order to detect a change amount of the steering angle when an ignition switch is turned off; and the step of supplying the counted number of pulses to the calculating circuit, when the ignition switch is turned on again, so as to correct the absolute steering angle stored in the memory.

As the present invention has the above construction and operation steps, the newly provided circuits of this invention are capable of extremely decreasing power consumption in dependency on the count of rectangular pulse, comparing with the prior art that the microcomputer calculates the absolute angle in dependency on the signals from the steering sensor. Accordingly, the power consumption may be extremely reduced at parking the vehicle to prevent the battery from discharging by detecting the change amount of the steering angle through the new circuits when the ignition switch is turned off at the parking.

Furthermore, the microcomputer is capable of maintaining the precise detection of the absolute angle in dependency on the stored value of the absolute angle when the switch is turned off and the change amount of the steering angle which is counted by the counter circuit at the time when the ignition switch is turned on again.

BRIEF DESCRIPTION OF THE DRAWINGS

FIG. 4 is a waveform diagram for explaining output characteristics of rotary encoders according to the embodiment shown in FIG. 2, in which

DETAILED DESCRIPTION OF THE PREFERRED EMBODIMENTS

There is described in detail preferred embodiments of the present invention according to attached drawings.

Figure 1A:
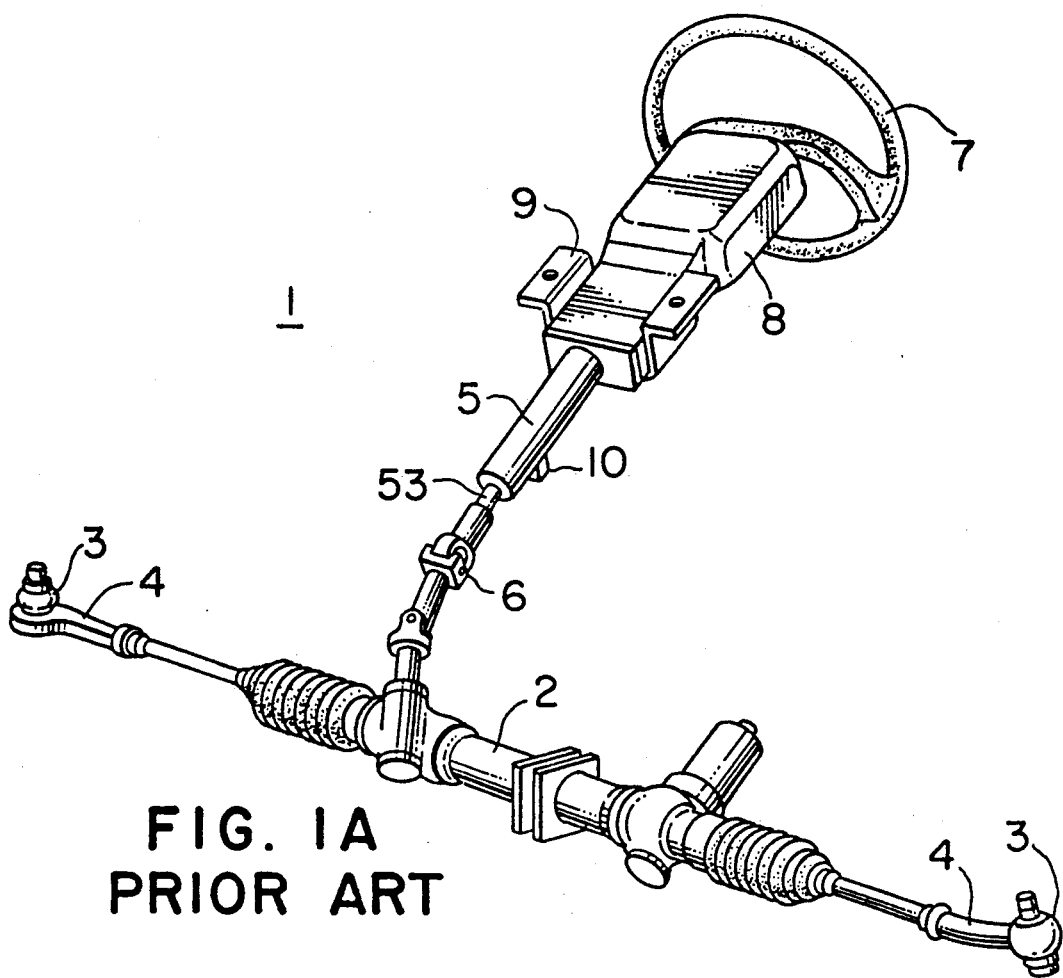
FIG. 1A is a perspective view schematically showing a steering system mounted on a vehicle and a steering sensor provided to the system.
Figure 1B:
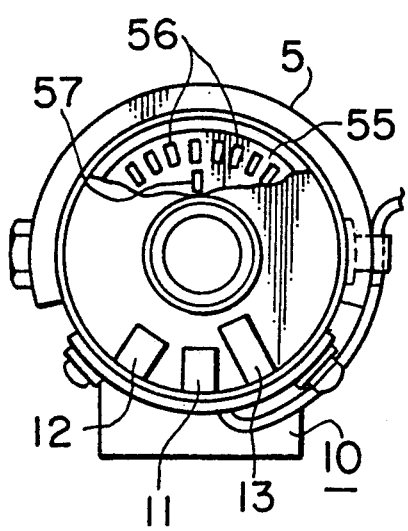
FIGS. 1B and 1C are partial sectional views schematically shOwing an arrangement of the sensor respectively at a vertical section and a cross section (prior art)
Figure 1C:
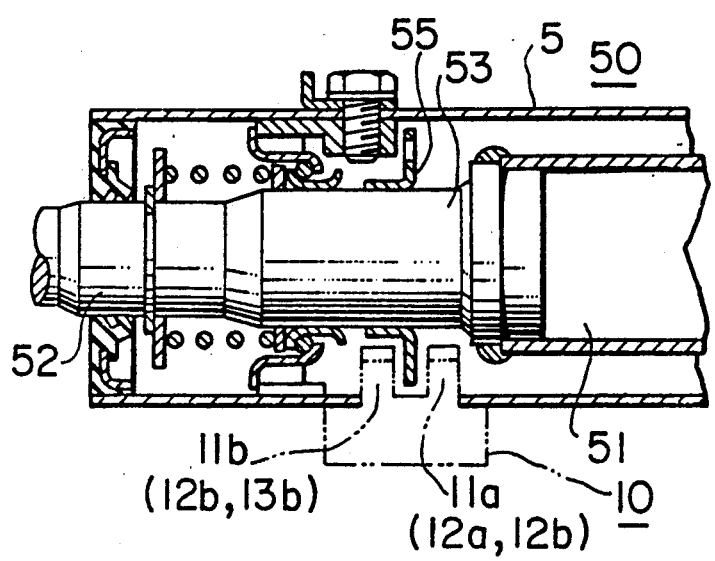

A steering sensor used in the present invention is the same as or corresponds to that of the prior art shown in FIGS. 1A and 1B.

Namely, the present invention uses a rotary encoder such as an optical type or magnetic type to generate two signals of sine wave-like having a phase discrepancy of 90 degrees responsive to a rotation of a steering shaft 53. In an embodiment now explained, the optical rotary encoder has a slit disc 55 mounted on the steering shaft 53 and photo-interrupters 11 to 13 fixed to a steering column 5, respectively.

When the slit disc 55 of the optical encoder rotates together with the steering shaft 53, each receptor of the photo-interrupters 11 and 12 receives a light and shade change from a corresponding emitter through a slit 56 of the disc 55 during a rotation of one slit pitch.

Figure 2:
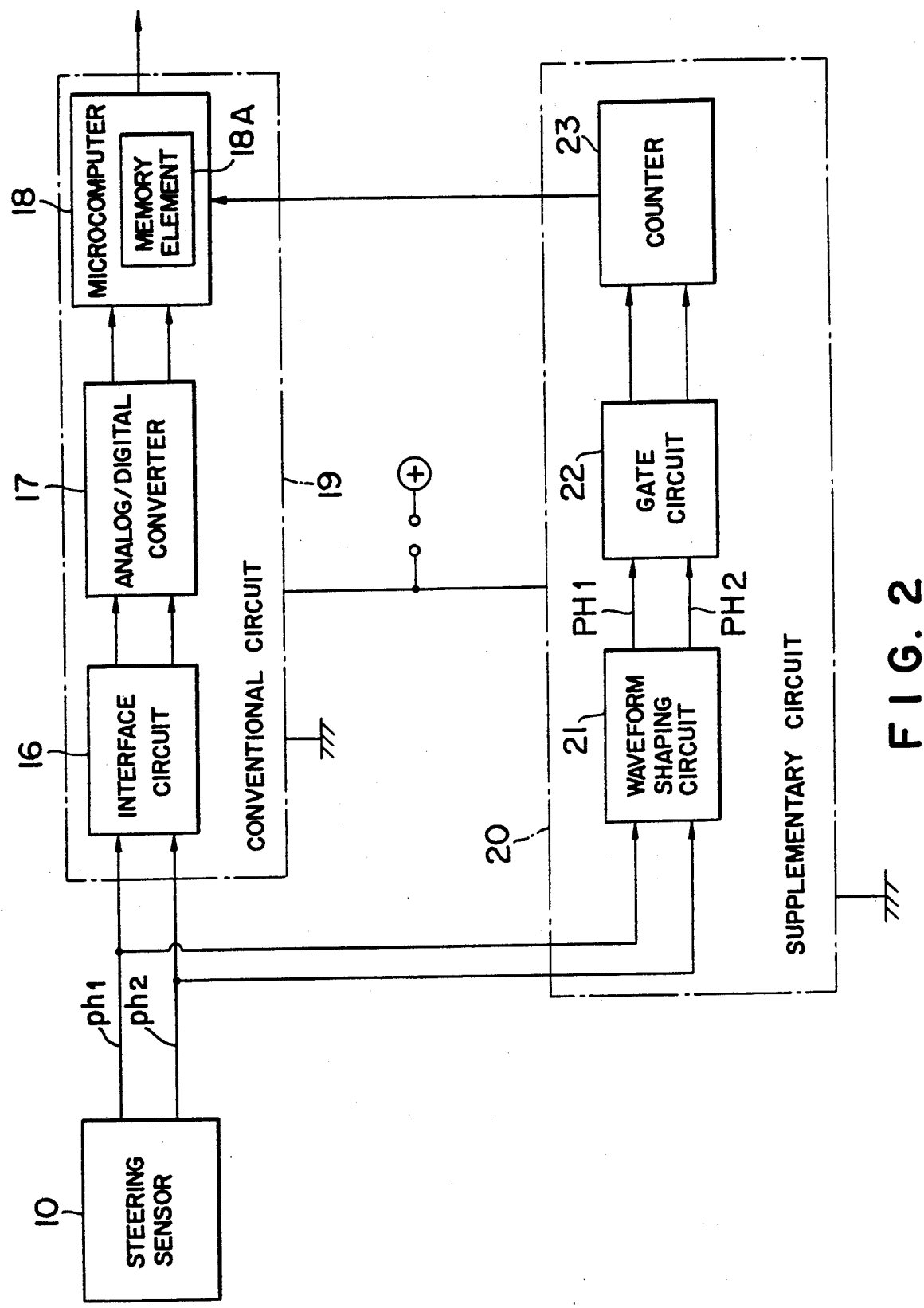
FIG. 2 is a block diagram showing a conceptual configuration of a steering sensor according to an embodiment of the present invention.
Figure 4A:
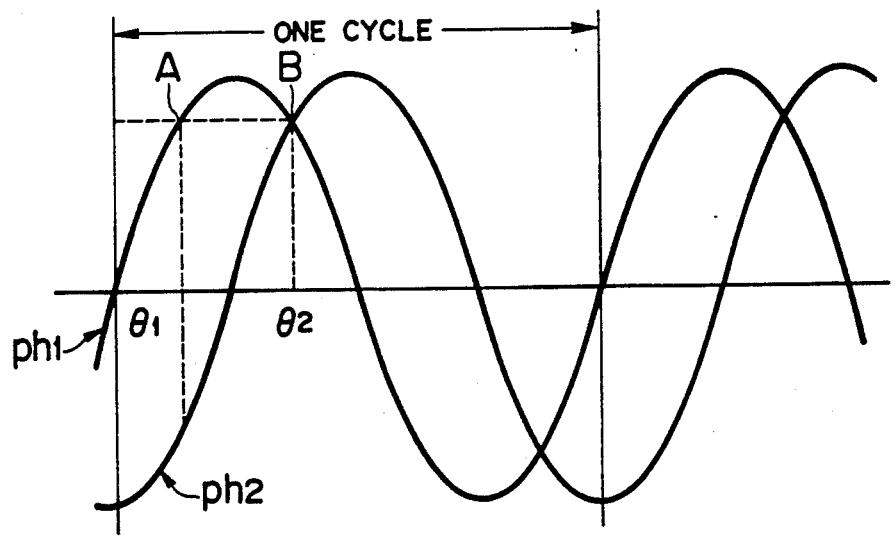
FIG. 4(a) shows waveforms of two sine wave signals of phase discrepancy of 90 degrees.

As shown in FIG. 2, the sensor 10 has pair of photo-interrupters 11 and 12, so as to output two voltage signals $ph_1$ and $ph_2$. The output voltages of the sensor 10 regularly varies as sine waveform-like with the variation of a steering angle, i.e., a rotational angle of the steering shaft 53, respectively, which sine waves have a phase discrepancy of 90 degrees each other, as shown in FIG. 4(a). The first and second output signals $ph_1$ and $ph_2$ are supplied to an analog/digital (A/D) converter 17 through an interface circuit 16. The A/D converter 17 converts the output signals $ph_1$ and $ph_2$ into digital signals to output into a microcomputer 18. Because a change amount of the steering angle is specified by the output signals $ph_1$ and $ph_2$, it is possible to provide the steering angle in dependency on the resolution of an A/D converter, thereby improving the resolution of the rotational angle.

Namely, when the first output signal $ph_1$ of zero volt represents a neutral position P of a steering wheel 7, a point A and a point B on FIG. 4(a) are not determined to have any rotational angle whether $\theta_1$ or $\theta_2$ because an output voltage of the sensor 10 at the point A is the same as that at the point B. However, if the second output signal $ph_2$ which has 90 degree discrepancy from the signal $ph_1$ is used, it is easy to determine the $\theta_1$ or $\theta_2$, so that it is possible to obtain the rotational angle of the steering shaft 53 corresponding to the output voltage of the signal $ph_1$ or $ph_2$ and to determine the rotational direction.

If the output signals of the sensor 10 vary along a plurality of cycles of sine waveforms (n cycles) per one rotation of the steering shaft 53, a rotational angle of the steering shaft 53 for one cycle of the sine waveform is 360/n degrees. Accordingly, an angle corresponding to the number of the passed sine waveform from the neutral position P is calculated by multiplying the number by 360/n degrees. Furthermore, an actual absolute steering angle, i.e., an absolute rotation angle of the steering shaft 53 is obtained by adding an angle corresponding to the output voltage of the sensor 10 to the above calculated angle. Namely, the absolute rotation angle of the steering shaft 53 is usually and properly obtained by counting and storing cycle numbers of the sine waves to the right or left direction from the neutral position P. For example, the rotation of the right direction represents plus while the left direction is minus, so that the cycle number is accurately counted. In a rear wheel steering control system for controlling the rear wheel according to the steering angle of a front wheel, the absolute steering angle of the first wheel detected by the sensor 10 are supplied to a control unit with a microcomputer.

In the above-described system, it is possible to improve the resolution and to detect the absolute angle accurately, but a circuit configuration is larger and the power consumption increases (requiring 30 mA including the consumption of the microcomputer).

As the steering wheel has a possibility to be turned around upon parking, it is necessary to usually maintain an "ON" state of the power source for turning around the steering wheel. Accordingly, though the power consumption of 30 mA does not influence the battery while an engine operates on the vehicle, the battery runs down when the ignition switch is turned off at the parking of the vehicle.

The present invention therefore has a supplementary (or an auxiliary) circuit 20 for the integration of a change amount of the steering angle, as shown in FIG. 2, in addition to a conventional circuit 19 including the interface 16, the A/D converter 17 and the microcomputer 18. Both circuits 19 and 20 are selectively backed up by the power supply from a battery through an ignition switch as mentioned later. The circuit 20 comprises a waveform shaping circuit 21 for changing the output signals $ph_1$ and $ph_2$ of sine waveform-like from the steering sensor 10 into rectangular signals $PH_1$ and $PH_2$ of pulse-like, a gate circuit 22, and a counter 23. The circuit 19 accurately detects the steering angle when the ignition switch is turned on. On the contrary, when the ignition switch is turned off, the power is only supplied to a memory element 18A in the microcomputer 18 and the supplementary circuit 20 starts to operate. The supplementary circuit 20 counts the number of the rectangular pulses by the counter 23 respective to output signal $PH_1$ and $PH_2$ from the waveform shaping circuit 21. When the ignition switch is turned on again, the microcomputer 18 sets the absolute angle at the time by adding an angle corresponding to the counted numbers to the absolute angle which is stored in the memory element 18A before the switch is turned off. After that, the microcomputer 18 detects the absolute angle in dependency on the digital signals from the A/D converter 17.

Namely, the supplementary circuit 20 produces one rectangular pulse responsive to one cycle of the sine waveform, so as to only detect the number of varied cycles in any direction of right or left while the ignition switch is turned off. However, when the switch is turned on again, the microcomputer 18 may read data of a change amount of the steering angle from the counter 23 of the supplementary circuit 20, so that it is possible to obtain the absolute angle accurately by the compensational detection of the steering angle during the parking.

Figure 4B:
FIGS. 4(b) and 4(c) show rectangular wave pulse signals converted from the sine wave signals shown in FIG. 4(a), respectively.
Figure 4C:

Though the detection of the change amount of the steering angle based on the signals $PH_1$ and $PH_2$ of the rectangular pulse-like, as shown in FIGS. 4(a) and 4(b), only have a lower resolution than the case of obtaining the steering angle based on the output signals ph1 and ph2 of the sine waveform-like, the supplementary circuit 20 and the memory element 18A waste the electric power of only few mA of a total amount of the shaping circuit 21, gate circuit 22 and counter 23. Accordingly, the system needs little power at parking, and prevents the battery from discharging.

Furthermore, as it is unnecessary to control various mechanisms according to the steering of the front wheel during parking, the supplementary circuit 20 is useful enough to roughly detect the change amount of the steering angle by counting the pulse numbers.

Figure 3:
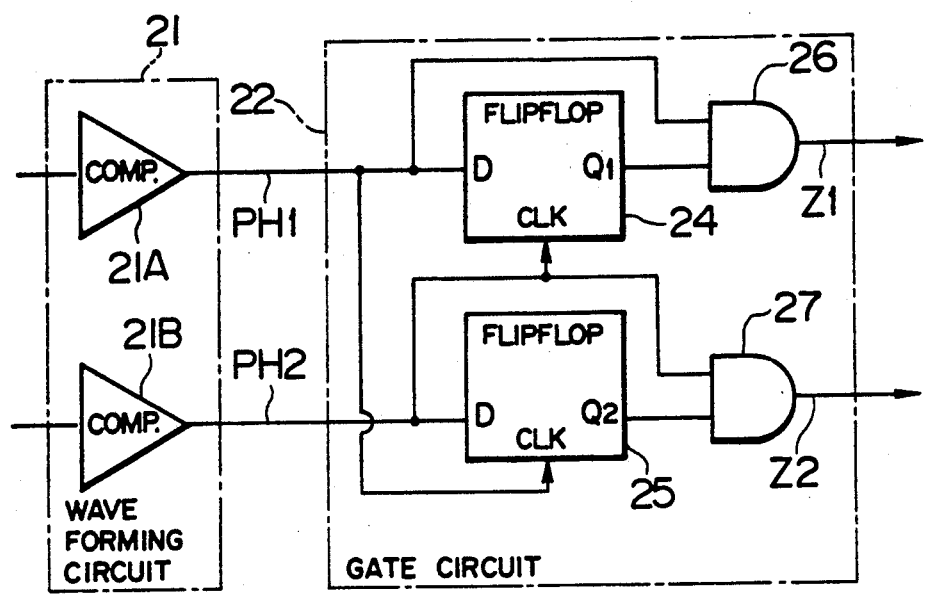
FIG. 3 is a circuit diagram showing the principal arrangements of a waveform shaping circuit and a gate circuit in the embodiment shown in FIG. 2.
Figure 5:
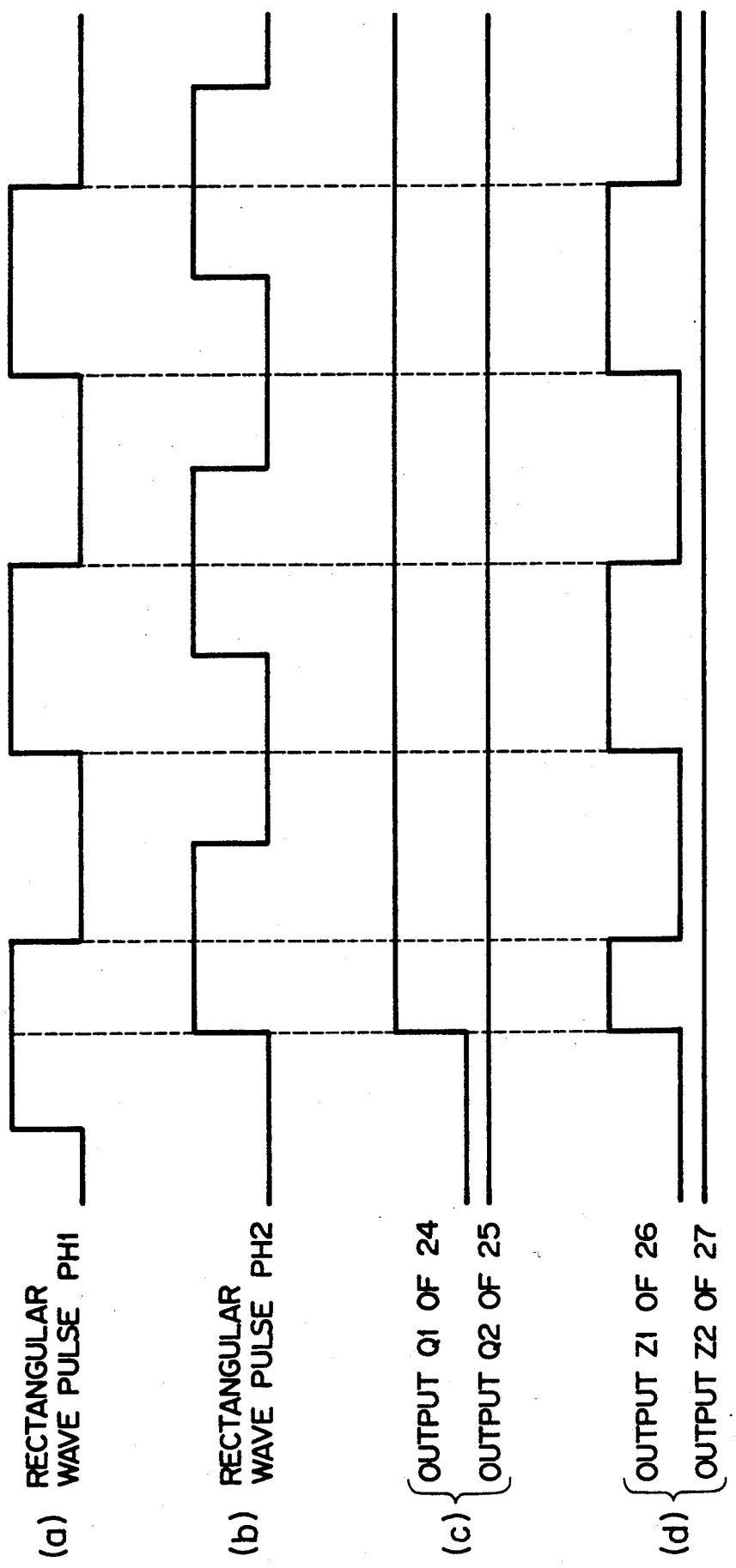
FIG. 5 is a timing chart showing timings of every output signals of the circuits shown in FIG. 3.

Next, there is described the principle configuration of the supplementary circuit according to FIGS. 3 and 5.

The waveform shaping circuit 21 includes comparators 21A and 21B in which bias circuit are omitted because of only having the general configuration. The comparators 21A and 21B respectively compare the output signals $ph_1$ and $ph_2$ with reference value such as zero volt, to shape the sine waveform into the rectangular pulses as shown in FIGS. 5(a) and 5(b). The output signals $ph_1$ and $ph_2$ turn around the phase relation in dependency on the rotational direction of right or left. The signals $PH_1$ and $PH_2$ are respectively supplied to delay terminals D and clock terminals CLK of delay (D) type flip-flop circuits 24 and 25 of the gate circuit 22 to obtain outputs of terminals $Q_1$ and $Q_2$, as shown in FIGS. 3 and 5(c). Then, AND gate circuits 26 and 27 of the circuit 22 take a logical integration (AND) between the signals $PH_1$ and $PH_2$ and outputs $Q_1$ and $Q_2$, respectively, to obtain outputs $Z_1$ and $Z_2$, as shown in FIG. 5(d).

In the case that the gate circuit 22 receives the signals $PH_1$ and $PH_2$ as shown in FIGS. 5(a) and 5(b), only the AND circuit 26 outputs signals $Z_1$ of the rectangular waveform-like as shown in FIG. 5(d). If the steering direction is turned around in the opposite direction, the signals $PH_1$ and $PH_2$ have waveforms opposite to the waveforms shown in FIGS. 5(a) and 5(b), respectively, thereby obtaining the signal $Z_2$ of the rectangular pulse-like from the AND circuit 27. The outputs $Z_1$ and $Z_2$ are supplied to the up and down terminals of the following counter 23, respectively, to count the change amount of the steering angle.

Though the above embodiment as shown in FIG. 2 has the circuit 19 for converting the output signals $ph_1$ and $ph_2$ from the steering sensor 10 into two digital signals and for calculating the absolute angle by the microcomputer in dependency on the two digital signals, the present invention is not limited in the construction. For example, a conventional circuit may analogically calculate a steering angle in dependency on two output signals from the sensor having a phase discrepancy of 90 degrees and converts an analog value of the angle into a digital signal. Then, a microcomputer digitally calculates the absolute angle in dependency on the digital signal. As a result, the well-known and optional circuit is applied to the circuit of the present invention as the steering angle detection circuit by using two output signals of the sine waveform-like from the sensor 10 having a phase discrepancy of 90 degrees.

As described in detail, the device and method for reducing the power consumption according to the present invention has a supplementary circuit for counting the rectangular pulses, i.e., the change amount of the steering angle, in addition to the conventional steering angle detection circuit. When the ignition switch is turned off, the power for the circuit is shut off without maintaining the storage of the absolute angle in the microcomputer, and the supplementary circuit is activated. Then, after the ignition switch is turned on again, the microcomputer reads pulse numbers counted while the ignition switch is turned off to reset the absolute angle. Accordingly, the device and method of the present invention may extremely reduce the power consumption for the steering angle detection system during parking, thereby preventing the battery from discharging, and obtaining much utilizable effects.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A device for decreasing power consumption in a steering angle detection system having a steering sensor for generating two signals of sine wave-like with a phase discrepancy of a predetermined degree responsive to a rotation of a steering shaft, and a steering angle calculating means responsive to said signals from said steering sensor for calculating an absolute steering angle and for storing said absolute steering angle in a memory while an ignition switch is turned on, said calculating means receiving no power supply when the ignition switch is turned off with the exception of the memory; said device comprising means for providing power when the ignition switch is turned off:
shaping means for shaping said two signals of sine wave-like into two signals of rectangular pulse-like;
counter means for counting a number of rectangular pulses output from said shaping means in order to detect an amount of the steering angle change when the ignition switch is turned off; and
said calculating means for further reading said number of pulses from said counter means to correct the absolute steering angle stored in the memory when said switch is turned on again.

2. A method for reducing power consumption in a steering angle detection system having a steering sensor for two signals of sine wave-like with phase discrepancy of a predetermined degree responsive to a rotation of a steering shaft, and a steering angle calculating means responsive to said signals from said steering sensor for calculating an absolute steering angle in a memory while an ignition switch is turned on, said calculating means receiving no power supply except the memory when the ignition switch is turned off, comprising the steps of providing power when the ignition switch is turned off:
shaping said two signals of sine wave-like into signals of rectangular pulse-like in a shaping means;
counting a number of the rectangular pulses output from said shaping means by a counter means in order to detect a change amount of the steering angle when an ignition switch is turned off; and
supplying the counted number of pulses to said calculating means, when the ignition switch is turned on again, so as to correct said absolute steering angle stored in the memory.

* * * * *